Figures 4, 7:
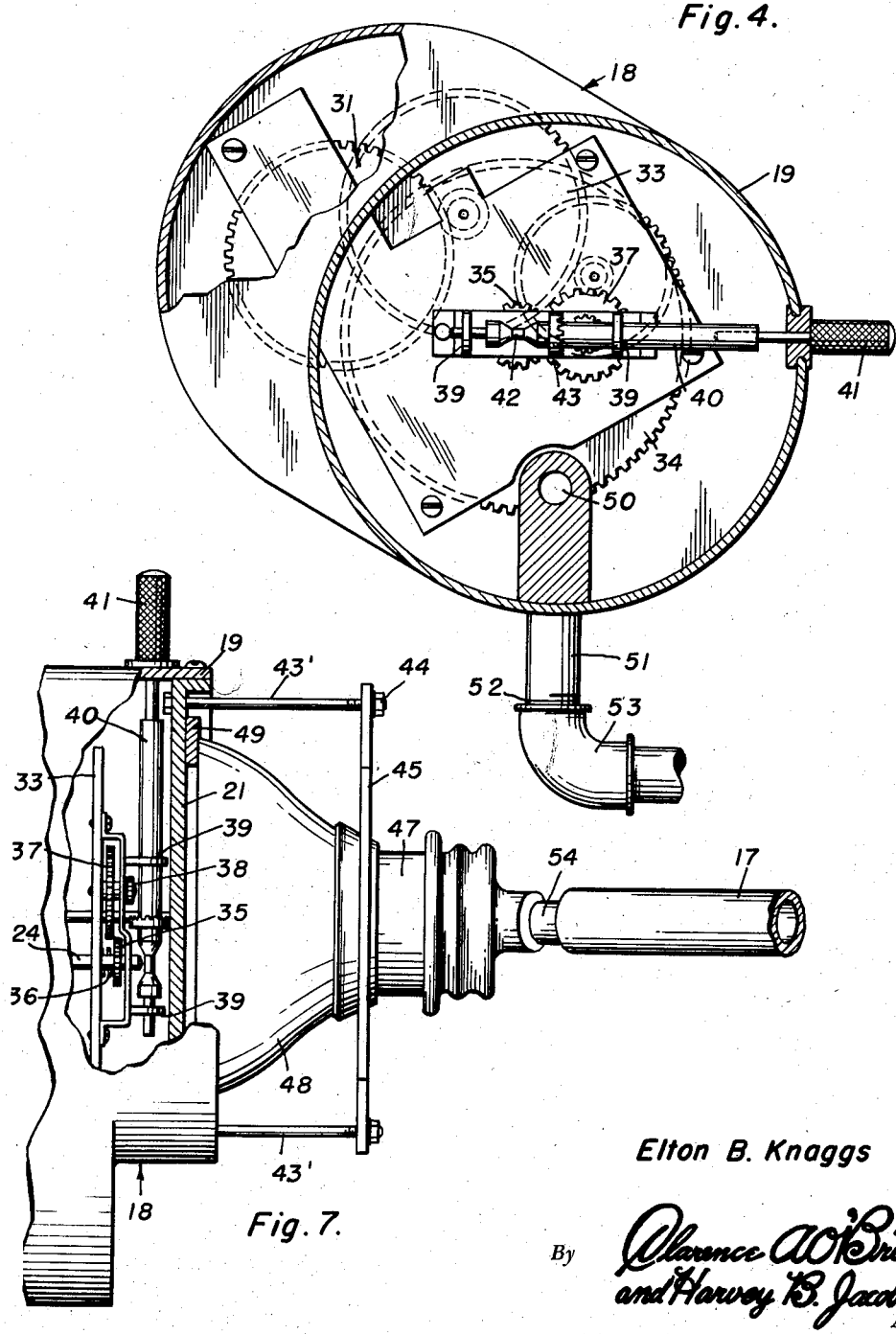

Sept. 4, 1951     E. B. KNAGGS     2,566,729
MILK METERING DEVICE
Filed June 30, 1947     3 Sheets-Sheet 1
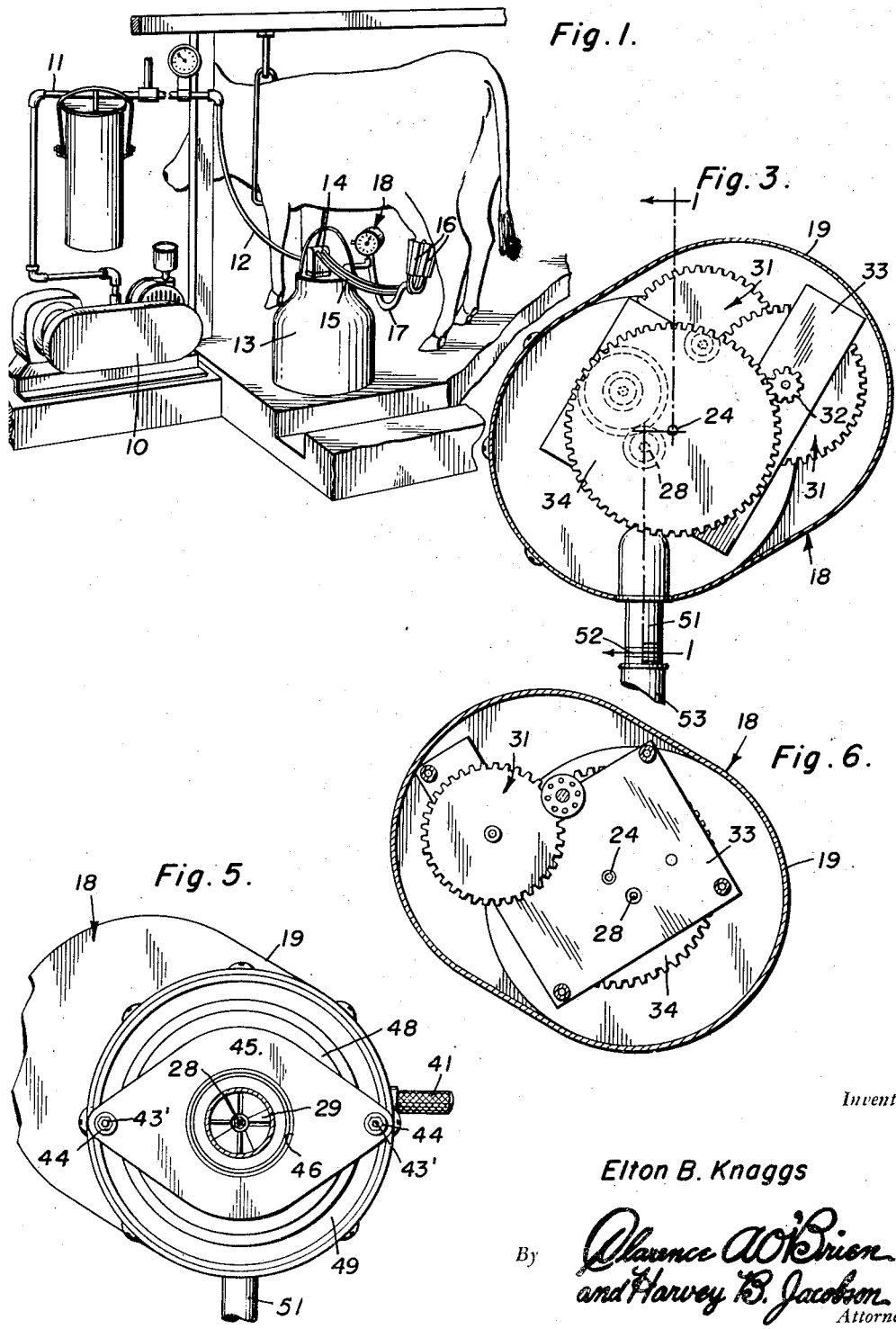
Inventor
Elton B. Knaggs
By Clarence A. O'Brien
and Harvey B. Jacobson
Attorneys Sept. 4, 1951     E. B. KNAGGS     2,566,729
MILK METERING DEVICE
Filed June 30, 1947     3 Sheets-Sheet 2
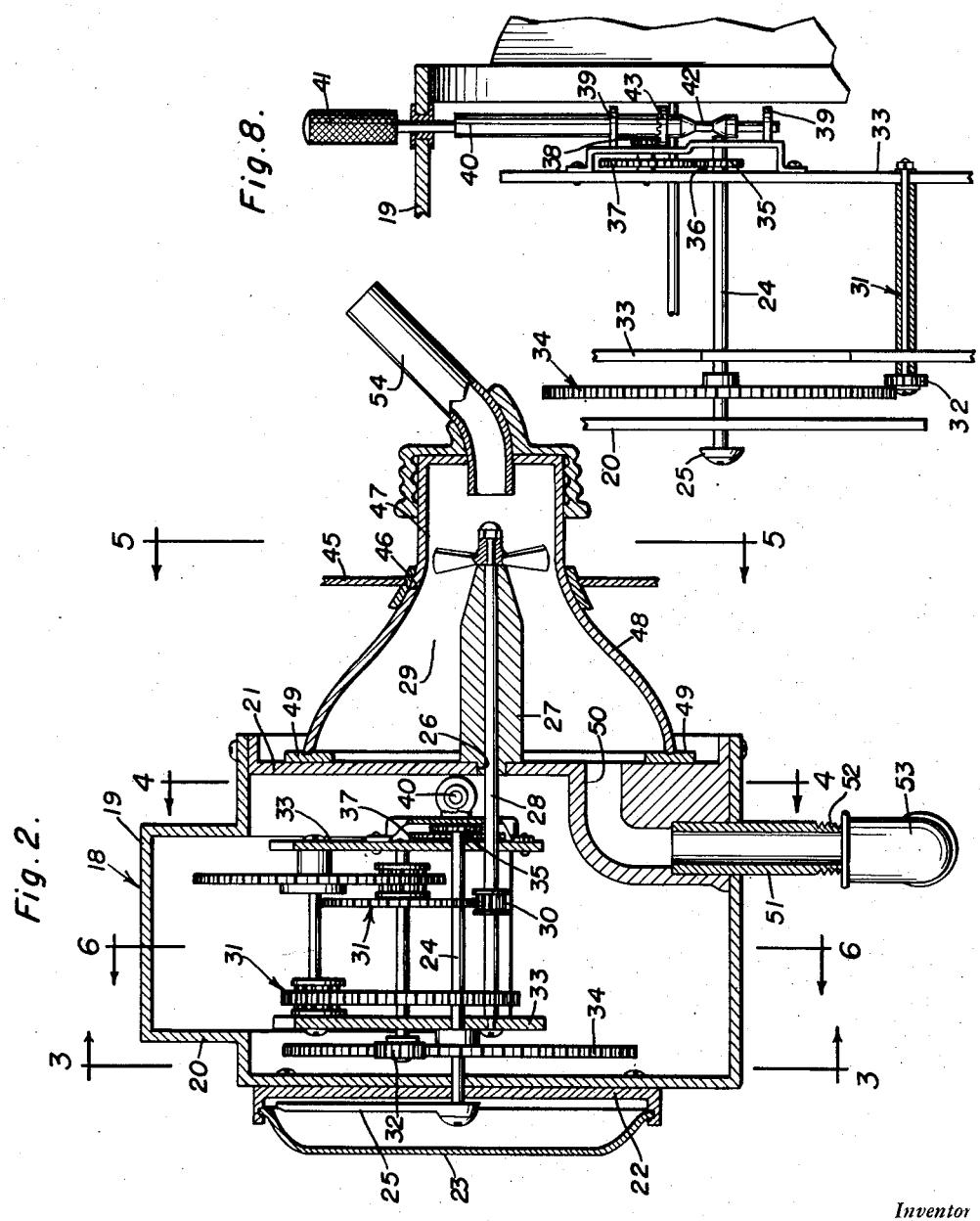
Inventor
Elton B. Knaggs
By *Clarence A. O'Brien and Harvey B. Jacobson*
Attorneys Sept. 4, 1951 E. B. KNAGGS 2,566,729
MILK METERING DEVICE
Filed June 30, 1947 3 Sheets-Sheet 3

Inventor
Elton B. Knaggs
By *Clarence A. O'Brien and Harvey B. Jacobson*
Attorneys Patented Sept. 4, 1951

2,566,729

UNITED STATES PATENT OFFICE 2,566,729

MILK METERING DEVICE

Elton B. Knaggs, Lapeer, Mich.

Application June 30, 1947, Serial No. 758,123

4 Claims. (Cl. 119—14.17)

1

This invention relates to a milking meter and more particularly to an attachment for use in conjunction with conventional milking machines to enable the user to determine the quantity of milk being given by a milk producing animal.

Milk measuring devices are known to be common in the art, particularly of the type employing a measuring receptacle as disclosed in Patent No. 1,519,827 issued December 16, 1924, to James W. Fuge. While such devices have been found admirably to serve their purpose as measuring devices, the objection to the use of such is found in that the milk leaving the cow's udder must come to repose in a container before it is delivered to the milker pail in order that the quantity of milk delivered may be determined. Since it is well recognized that milk should be refrigerated as soon after leaving the udder as possible, it is evident that any delay in its transit from the cow's udder to the milker pail tends to defeat the rapid refrigeration of the milk.

It is an object of this invention to enable the quantity of milk given by a milk producing animal to be measured without in any way delaying its delivery from the udder to the milker pail.

Another object is to facilitate the cleansing and sterilization of the parts which contact the fluid milk so as to preserve the sanitary conditions under which the milk is handled.

The above and other objects may be attained by employing this invention which embodies among its features a fluid driven motor adapted to be interposed between the teat cups and the milker pail of a conventional milking machine, an indexed dial carried by the fluid driven motor and an index pointer driven by the motor and operating over the face of the dial to indicate the quantity of milk given by the animal being milked.

Other features include isolating the motor impeller from the rest of the mechanism and enclosing it in a wide mouthed dome-shaped cover which is separable from the main body of the motor to render accessible for cleaning the impeller and the surfaces of the cover which contact the fluid milk.

In the drawings,

Figure 1 is a perspective view of a milking machine illustrating this improved milking meter in use thereon, Figure 2 is an enlarged vertical sectional view through the milk meter showing the impeller and the enclosing dome-shaped cover therefor, Figure 3 is a vertical sectional view taken substantially along the line 3—3 of Figure 2,

2

Figure 4 is a vertical sectional view taken substantially along the line 4—4 of Figure 2, Figure 5 is a sectional view taken substantially along the line 5—5 of Figure 2 on a somewhat reduced scale, Figure 6 is a sectional view on a reduced scale taken substantially along the line 6—6 of Figure 2, Figure 7 is a fragmentary plan view of the milk meter, showing portions broken away more clearly to illustrate certain details of construction, and Figure 8 is a view similar to Figure 7, showing the re-setting shaft in a different position.

Referring to the drawings in detail, a milking machine 10 is equipped with a conventional vacuum pipe 11 which is connected through a flexible hose to a conventional milker pail 13 carrying a conventional milker pulsator 14 which is coupled through the air tubes 15 of conventional form to the teat cups 16. These cups are connected in a conventional manner to a conventional milk tube 17 through which the milk is normally delivered into the milker pail.

In order that the quantity of milk given by a milk producing animal may be measured as it is introduced into the milker pail, I connect to the milk inlet of a milker pail, my improved milk meter designated generally 18 to the inlet side of which is coupled the end of the milk tube 17 previously referred to.

The milk meter 18 previously referred to comprises a hollow body 19 having a front wall 20 and a back wall 21. The front wall 20 is fitted with a dial plate 22 carrying on its exposed face an annular row of spaced indices the purpose of which will hereinafter appear. A transparent cover 23 encloses the face of the dial 22 and extending axially through the dial is a shaft 24 carrying at one end an index pointer or hand 25 which is adapted to move over the face of the dial to cooperate with the indices thereon in indicating the quantity of milk delivered from a milk producing animal to the milker pail 13.

Extending through the rear wall 21 of the casing 19 is an opening 26 in which an outwardly extending cylindrical sleeve 27 is fixed. A drive shaft 28 extends through the sleeve 27 into the housing 19 and carries at its outer end an impeller screw 29 which is adapted to be contacted by the inflowing milk to cause the shaft 28 to be rotated by the moving fluid. Fixed to the shaft 28 intermediate its ends is a lantern gear 30 which is coupled through a train of speed reducing gears and pinions designated generally 31 to a drive pinion 32 which is mounted to rotate near the front wall 20 of the casing in a suitable supporting frame 33. The shaft 24 previously described is mounted for rotation and longitudinal sliding movement in the frame 33 and carries adjacent one end a gear 34 which during the normal operation of the device meshes with the pinion 32 above mentioned. Fixed to the shaft 24 adjacent its opposite end is a pinion 35 and surrounding the shaft between the frame 33 and the pinion 35 is a compression coil spring 36 which serves to hold the shaft 24 shifted longitudinally in the frame 33 so that the gear 34 meshes with the pinion 32.

An idler pinion 37 is mounted to rotate on the frame 33 in a position to mesh with the pinion 35 when the shaft 24 is shifted longitudinally against the effort of the spring 36 and fixed to rotate about the axis of the idler gear 37 is a pinion 38, the purpose of which will be more fully hereinafter described.

Mounted for rotational and longitudinal sliding movement in a pair of spaced brackets 39 carried by the frame 33 is a resetting shaft 40 one end of which projects through the side of the casing 19 and carries a knurled thumb-piece 41. The axis of the shaft 40 intersects the axis of the shaft 24 and formed in the shaft 40 adjacent the point of intersection of the said axes is an annular groove 42 opposite ends of which are conical in form so that when the shaft 40 is moved outwardly in the brackets 39 the shaft 24 will be shifted longitudinally to move the gear 34 out of mesh with the idler gear 37. A crown gear 43 is fixed to the shaft 40 between the pinion 38 and the groove 42 so that as the pinion 35 meshes with the idler gear 37, the crown gear 43 will mesh with the pinion 38 and hence upon rotating the shaft 40 the hand or index pointer 25 will be moved over the face of the dial 22 to reset the pointer.

Extending outwardly from the back wall 21 in spaced parallel relation to the bushing 27 are posts 43' fitted on the outer ends of which are clamping nuts 44. A clamp plate 45 is supported on the posts 43' and is provided with an axial opening for the reception of the reduced end 47 of a hollow substantially dome-shaped cover 48, the enlarged end of which seats against a gasket 49 which bears against the outer face of the back wall 21 in concentric spaced relation to the bushing 27. Formed in the back wall 21 is a milk discharge opening 50 which extends radially through the casing 19 and has fitted in the end opposite that opening through the back wall 21 a nipple 51 which is externally screw threaded as at 52 for connection to a suitable fitting 53 which leads to the milk intake opening of the milker pail 13. Entering the reduced end of the cover 48 is a tubular nipple 54 to which the discharge end of the milk tube 17 is adapted to be coupled. It will thus be seen that milk discharged through the milk tube will be introduced into the cover 48 around the impeller 29, causing the same to rotate the shaft 28 and drive the gear train 29 and shaft 24 to move the index hand over the dial 22. The flowing milk is then discharged through the passage 50, nipple 51 and coupling 53 to the milk receiving opening of the milker pail 13 so that the volume of milk passing into the milker pail may be registered on the dial.

In use, the coupling 53 is connected to the milker pail milk inlet opening and the milk tube 17 is coupled to the nipple 54 so that as the milk is drawn through the milk tube 17 it must enter the chamber formed by the cover 48 and back wall 21 to flow past the impeller 29, and thereby drive the shaft 28. Obviously, when it is desired to clean the milk passages, the nuts 44 are removed from the studs 43, thus loosening the plate 45 and relieving the pressure of the cover 48 against the gasket 49 so as to permit the cover to be removed from the back wall 21. Owing to the flared contour of the cover it is obvious that it is readily accessible for cleaning and sterilizing and since the back wall 21 presents a flat surface except for the bushing 27, the parts coupled to the gear train and index hand easily may be cleansed and sterilized. Likewise, the passage 50 is rendered accessible for easy cleaning and the entire device may be kept in a sanitary condition, with a minimum amount of labor. When it is desired to determine the quantity of milk produced by an individual animal it is only necessary to exert pull on the knob 41 and rotate the shaft 40 to turn the index pointer or hand 25 to zero on the dial. Having set the pointer to zero, the shaft 40 is returned to its original position so as to reconnect the pointer shaft 24 to the gear train. When the milking starts, the fluid milk will drive the impeller 29, thus driving the gear train 31 and shaft 24 to move the hand 25 over the face of the dial 22. When the full quantity of milk has been delivered to the milker pail, its volume may be determined by noting the position of the hand on the dial.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In combination with a milking system including a group of teat cups, a milker pail, a milker pulsator disposed on said milker pail, air tubes interconnecting said milker pulsator and teat cups, and a milk tube interconnecting said teat cups and milker pail for delivering milk from the teat cups to the milker pail, metering means for determining the quantity of milk flowing through the conduit means, said metering means being interposed in the milk tube between said teat cups and said milker pail and including a casing and an impeller rotatably supported therein, said milk tube directing the flow of milk against said impeller, and indicating means associated with said impeller for indicating the amount of fluid passing through the milk tube.

2. In combination with a milking system including a group of teat cups, a milker pail, a milker pulsator disposed on said milker pail, air tubes interconnecting said milker pulsator and teat cups, and a milk tube interconnecting said teat cups and milker pail for delivering milk from the teat cups to the milker pail, metering means for determining the quantity of milk flowing through the conduit means, said metering means being interposed in the milk tube between said teat cups and said milker pail and including a casing and an impeller rotatably supported therein, said milk tube directing the flow of milk against said impeller, and indicating means associated with said impeller for indicating the amount of fluid passing through the milk tube, said last named means including a dial disposed at the exterior of said casing, a pointer rotatably mounted on the face of the dial and a gear train operatively connected between the impeller and pointer.

3. In combination with a milking system including a group of teat cups, a milker pail, a milker pulsator disposed on said milker pail, air tubes interconnecting said teat cups and milker pail for delivering milk from the teat cups to the milker pail, metering means for determining the quantity of milk flowing through the conduit means, said metering means being interposed in the milk tube between said teat cups and said milker pail and including a fluid driven motor, an indexed dial and an index pointer driven by the motor and operating over the face of the dial to indicate the quantity of milk given by the cow being milked.

4. In combination with a milking system including a group of teat cups, a milker pail, a milker pulsator disposed on said milker pail, air tubes interconnecting said teat cups and milker pail for delivering milk from the teat cups to the milker pail, metering means for determining the quantity of milk flowing through the conduit means, said metering means being interposed in the milk tube between said teat cups and said milker pail and including a fluid driven motor, an indexed dial and an index pointer driven by the motor and operating over the face of the dial to indicate the quantity of milk given by the cow being milked, and resetting shaft carried by the motor and shiftable longitudinally along its own axis for disconnecting the pointer from the motor and resetting the hand to zero when the milking of a cow has been completed.

ELTON B. KNAGGS.

REFERENCES CITED

The following references are of record in the file of this patent:

UNITED STATES PATENTS

| Number | Name | Date |
| --- | --- | --- |
| 107,900 | Groat | Oct. 4, 1870 |
| 451,129 | Miller | Apr. 28, 1891 |
| 1,585,255 | McFadden | May 18, 1926 |
| 1,656,134 | Birkett | Jan. 10, 1928 |
| 1,910,830 | Hapgood | May 23, 1933 |
| 1,977,511 | Graves | Oct. 16, 1934 |
| 2,060,674 | Hicks | Nov. 10, 1936 |
| 2,102,267 | Hodson | Dec. 14, 1937 |
| 2,376,717 | Omdalen | May 22, 1945 |

FOREIGN PATENTS

| Number | Country | Date |
| --- | --- | --- |
| 630,937 | France | Sept. 3, 1927 |